(12) United States Patent
Sahai et al.

(10) Patent No.: US 7,069,019 B2
(45) Date of Patent: Jun. 27, 2006

(54) SYSTEM AND METHOD TO ESTIMATE THE LOCATION OF A RECEIVER

(75) Inventors: Anant Sahai, Berkeley, CA (US); Andrew Chou, South San Francisco, CA (US)

(73) Assignee: SiRF Technology, Inc., San Jose, CA (US)

( * ) Notice: Subject to any disclaimer, the term of this patent is extended or adjusted under 35 U.S.C. 154(b) by 138 days.

(21) Appl. No.: 10/237,557

(22) Filed: Sep. 6, 2002
(Under 37 CFR 1.47)

(65) Prior Publication Data
US 2004/0176099 A1    Sep. 9, 2004

Related U.S. Application Data

(60) Provisional application No. 60/318,538, filed on Sep. 8, 2001.

(51) Int. Cl.
*H04Q 7/20*    (2006.01)

(52) U.S. Cl. ............... 455/456.1; 455/456.2; 455/456.5; 342/357.15

(58) Field of Classification Search ............ 455/456.1, 455/456.2, 456.5; 342/357.12, 357.15
See application file for complete search history.

(56) References Cited

U.S. PATENT DOCUMENTS

| | | | | |
|---|---|---|---|---|
| 6,002,361 | A * | 12/1999 | Schipper ................ 342/357.03 |
| 6,070,078 | A * | 5/2000 | Camp et al. ............. 455/456.2 |
| 6,072,428 | A * | 6/2000 | Schipper et al. ........ 342/357.01 |
| 6,134,228 | A * | 10/2000 | Cedervall et al. ........... 370/335 |
| 6,154,656 | A * | 11/2000 | Camp, Jr. ................ 455/456.2 |
| 6,208,290 | B1 * | 3/2001 | Krasner .................. 342/357.05 |
| 6,215,442 | B1 * | 4/2001 | Sheynblat et al. ..... 342/357.06 |
| 6,249,252 | B1 * | 6/2001 | Dupray ....................... 342/450 |
| 6,512,479 | B1 * | 1/2003 | Sahai et al. ............. 342/357.15 |
| 6,535,163 | B1 * | 3/2003 | Sahai et al. ............. 342/357.12 |
| 6,542,116 | B1 * | 4/2003 | Sahai et al. ............. 342/357.12 |
| 6,754,503 | B1 * | 6/2004 | Aldaz et al. ................. 455/504 |
| 2003/0022676 | A1 * | 1/2003 | Nakamoto et al. .......... 455/456 |

\* cited by examiner

*Primary Examiner*—William Trost
*Assistant Examiner*—Brandon J. Miller
(74) *Attorney, Agent, or Firm*—Edward C. Kwok; MacPherson Kwok Chen & Heid LLP

(57) ABSTRACT

System and method to determine the location of a receiver are provided. The received signal is decomposed into signal chunks that are then correlated with the reference signals of the transmitting sources. In some embodiments, the signal chunks may be shorter than the period of the reference signals. For each signal source, a grid of correlation values is constructed containing one column of correlation values for each signal chunk. Each column contains correlation values for several code-phases. Probes are executed in the grid to acquire the location-determining signals. In some embodiments, a probe includes calculating the fourier transform of a row in the grid, yielding correlation values associated with a refined set of frequency values. Potential acquisitions are verified by processing increasing portions of the received signal. Confirmed acquisition may be used to aid further acquisitions. Some embodiments eventually compress the received signal down to a one period duration by means of an ultra-stacking method. Additional verification, comprising multi-peak test and multi-path tests, may be performed on the correlation magnitude curve obtained from the ultra-stacked signal. Finally, refined code-phase values are extracted from these correlation magnitude curves.

36 Claims, 6 Drawing Sheets

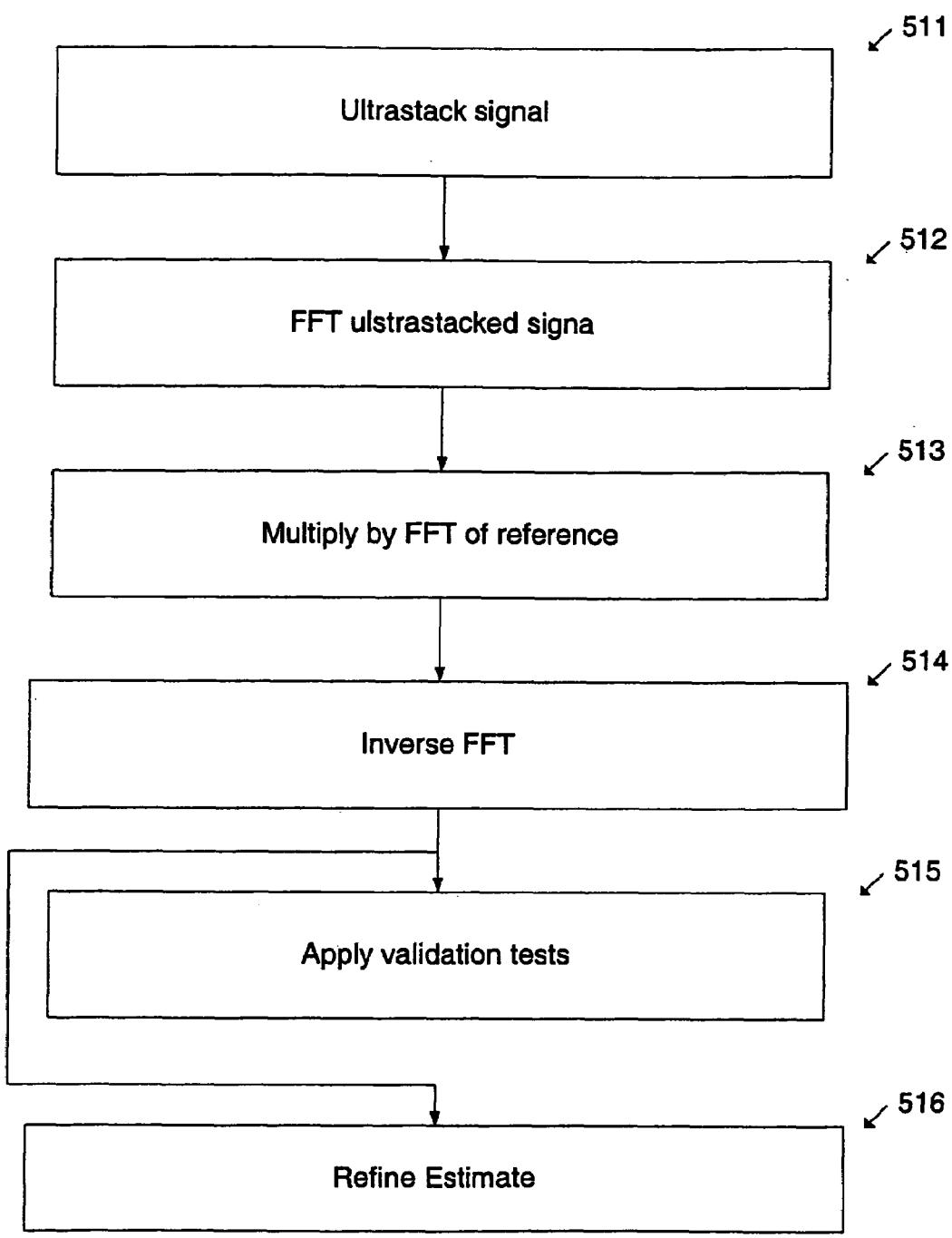
FIG. 5.1

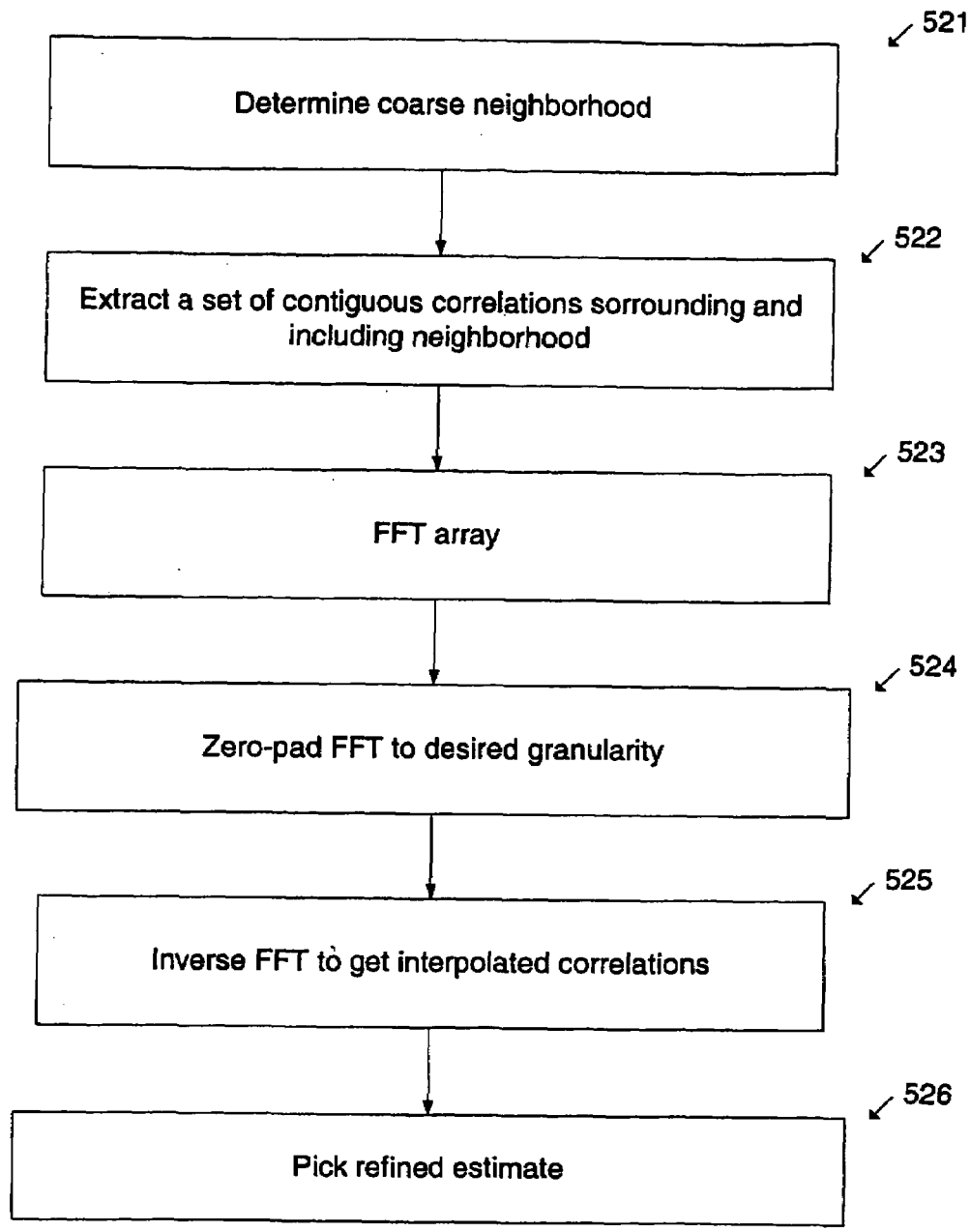
FIG. 5.2

SYSTEM AND METHOD TO ESTIMATE THE LOCATION OF A RECEIVER

CROSS REFERENCE TO RELATED APPLICATIONS

This application claims the benefit of U.S. Provisional Application No. 60/318,538, filed Sep. 8, 2001, entitled "Ultrastacked refinement, frequency-following probes, sub-millisecond chunking, and mixed references for position determination".

FIELD OF THE INVENTION

The present invention relates to signal processing and, more particularly, to techniques helpful in determining the location of a signal receiver.

BACKGROUND OF THE INVENTION

The location of a device may be determined using a global positioning system ("GPS"). In a general GPS system, a receiver acquires signals from four or more satellite vehicles to obtain a three dimensional location and a time stamp. A receiver may employ multiple channels and the received signal in each channel may be used to acquire a signal from a single signal source. After acquisition, a delay-locked loop is traditionally used to track the signal source and is used to give updates to the receiver position through time. GPS satellite vehicles emit two microwave carrier signals of L1 and L2 frequency. The two microwave carrier signals are modulated by: 1) a C/A code (Coarse Acquisition), 2) a P-Code (Precise), and 3) a data message.

The C/A code is a repeating 1 MHz Pseudo Random Noise (PRN) code that modulates the signal at frequency L1. The C/A PRN code comprises 1023 chips that repeat every millisecond. There is a different C/A PRN code for each GPS satellite vehicle. The P-Code modulates the signals at both the L1 and L2 frequencies. The P-Code is a 10 MHz PRN code. The data message modulates the L1-C/A code signal. The data message is a 50 Hz signal consisting of data bits, also known as "navigation bits", that give a time stamp, the GPS satellite vehicle orbits, clock corrections, and other parameters. All of this data is useful for the receiver to know in order to calculate and update its position. In traditional GPS systems, this data is decoded from the signal after the signal has been acquired and acquisition is carried out without the benefit of knowing this data.

In one approach, a receiver may attempt to acquire a signal by: 1) generating a replica of the PRN code emitted by a satellite vehicle that is potentially visible overhead the receiver, and 2) determining a correlation between the received signal and a suitable modulated replica code. Typically, the correlation between the received signal and the replica code is performed by calculating the In Phase ("I") and Quadrature ("Q") correlation integrals.

The uncertainty in the carrier modulation frequency arises from two primary sources. The first is the net movement of the individual signal source relative to the receiver. In the case of GPS, the signal source is a satellite moving at a speed of a few thousand meters every second while the receiver may also be moving at a usually slower but usually unknown speed. In the case of GPS, the velocity of the satellite may be calculated to very high accuracy by the receiver once it has access to the current orbital parameters of the satellite in question and the current time. The motion of the signal source and the motion of the receiver introduce a Doppler shift that effectively compresses or dilates the signal in time, resulting in a change in modulation frequency as well. The second major source of frequency uncertainty is the imperfect syntony between the clock on the receiver and the clock in the signal source. Since the signal source clock and the receiver clock are generally distinct, there is a net slowing-down or speeding-up of time between the signal source and the receiver. This clock drift of the receiver relative to the source is also experienced as a compression or dilation of the signal at the receiver and is herein referred to as "clock Doppler."

In addition to the frequency uncertainty, there is an uncertainty introduced due to the unknown propagation delay from the signal source to the receiver. The speed of light is finite and hence it takes a finite time proportional to the distance between the source and the receiver for the signal to arrive at the receiver after being transmitted at the source.

The initial problem of acquiring a signal therefore involves a search over the exact modulation frequency and the delay to the signal source. The pseudorandom structure underlying the signal ensures that the magnitude of the correlation integrals will be relatively small if either the modulation frequency or the delay is substantially different from the true value. Finally, the repeating nature of the PRN code implies that the delay value provides range information only modulo the time of repetition, unless a priori knowledge about the data bits is used.

In traditional positioning systems, the problem of acquisition is solved mostly independently for the different signal sources. Each channel successively tests different delay and frequency hypotheses, and computes I and Q correlations for them. When a sufficiently high value is found, it is tracked for a while and the receiver attempts to decode the data bits. Different channels may be allocated to search for different signal sources, but there is no substantial interaction between the different searches during the acquisition phase. A significant disadvantage of the above approach to acquisition is that it might have to search for a long amount of time before it has acquired enough signals to proceed. The longer the duration of coherent integration, the more finely the modulation frequency has to be known. The more attenuated the signal, the longer the duration of computing the correlations at any given frequency and delay pair must be before the signal can be discriminated from the noise. These two problems combine to make search in attenuated environments prohibitively expensive in terms of either required delays or the number of independent channels needed to acquire the signals. Furthermore, the independence of the channels for each signal in the acquisition phase does not leverage the calculations for the clock Doppler and delay values performed with respect to one signal source to aid the calculations with respect to another signal source.

After acquisition, in traditional GPS, the distance to each satellite is estimated by decoding the time stamp information embedded in the data message and comparing it to the time of reception by the receiver's own clock. The result of this comparison is traditionally referred to as a "pseudorange" and is expressed in meters rather than seconds by multiplying by the speed of light. Any net drift due to the imperfect synchronization of the two clocks is corrected for through a space/time triangulation procedure combining the pseudoranges from four or more signal sources. This procedure also results in an initial position estimate. This estimate is then updated through time using the outputs of delay locked loops tracking the received signals. This approach suffers from the drawback of having to wait for the time-stamp in the data message before giving even an initial position fix. In traditional GPS, the time stamps are transmitted only once every few seconds. This means that even if the receiver is able to acquire all the satellites instantly, it still might have to wait up to a few seconds before being able to give any position estimate at all.

Some of these difficulties are partially mitigated by the techniques of assisted GPS but many of them remain problematic, especially in challenging attenuated environments such as urban buildings. In such environments, the traditional assisted GPS technologies become impractical due to the computation expense and/or the for very long sampling times.

Our earlier U.S.A. patent applications entitled "SIGNAL ACQUISITION USING DATA BIT INFORMATION" (Ser. No. 09/888,228 filed Jun. 22, 2001. Hereafter referred to as Application 228) which is expressly incorporated herein by reference, "SYNTHESIZING COHERENT CORRELATION SUMS AT ONE OR MULTIPLE CARRIER FREQUENCIES USING CORRELATION SUMS CALCULATED AT A COARSE SET OF FREQUENCIES" (Ser. No. 09/888,227 filed Jun. 22, 2001. Hereafter referred to as Application 227) which is expressly incorporated herein by reference, "EXTRACTING FINE-TUNED ESTIMATES FROM CORRELATION FUNCTIONS EVALUATED AT LIMITED NUMBER OF VALUES" (Ser. No. 09/888,338 filed Jun. 22, 2001. Hereafter referred to as Application 338) which is expressly incorporated herein by reference "DETERMINING THE SPATIO-TEMPORAL AND KINEMATIC PARAMETERS OF A SIGNAL RECEIVER AND ITS CLOCK BY INFORMATION FUSION" (Ser. No. 09/888,229 filed Jun. 22, 2001. Hereafter referred to as Application 229) which is expressly incorporated herein by reference, and "DETERMINING LOCATION INFORMATION USING SAMPLED DATA CONTAINING LOCATION-DETERMINING SIGNALS AND NOISE", (Ser. No. 09/888,337 filed Jun. 22, 2001. Hereafter referred to as Application 337) which is expressly incorporated herein by reference, disclosed new techniques that dramatically reduced computational burdens. However, the techniques described explicitly there generally operate with an integer number of milliseconds as the smallest sized data chunks for processing. If the frequency uncertainty were large, the traditional solution of redoing the calculations using many disjoint smaller frequency ranges spanning the original larger frequency range would have to be utilized. This introduces a computational slowdown that is roughly linear in the large frequency uncertainty. In some practical situations, the slowdown may be as large as a factor of four or more.

Therefore, there is clearly a need for a faster approach that is less impacted computationally by the size of the frequency uncertainty, when this uncertainty is large.

SUMMARY OF THE INVENTION

Techniques are provided that aid in determining the location of a signal receiver based on sampled data arising from a received signal that contains location-determining signals and noise. According to one aspect of the invention, the sampled data is processed with special probes performed at a sequence of points with increasing lengths between them. Bounds for the delay value and bounds for the modulation frequency value of the received signal are calculated for each signal source from a set of signal sources that are potentially detectable at the signal receiver. An estimate ("nominal value") for the delay value, a value range for the delay value, an estimate for the modulation frequency value, and a value range for the modulation frequency value are calculated by iteratively updating the current bounds for the delay value and for the modulation frequency value based on the results of the special probes. The iterative update of the current value range for the delay value and for the modulation frequency value is performed over the set of signal sources and at the sequence of probe points. The results obtained from the calculations for one acquired signal source are used to refine the estimates for the other as yet unacquired sources.

In cases of large frequency uncertainty, one aspect of the invention is that the raw data is processed in chunks that are a fraction of a millisecond long, and that the FFTs of the raw data chunks are only taken once and reused in the computations of correlations with the other satellites' reference signals.

According to another aspect of the invention, for each signal source, coherent I and Q correlation integrals are synthesized and their magnitude values are calculated corresponding to various choices for the delay value and for the modulation frequency value, within a search range determined by the current bounds and value ranges. The choices for the delay value and for the modulation frequency are initially made at a coarse scale, and then a "depth first" frequency probe is executed that refines the frequency estimate for this signal source.

The total shape of the magnitude-curve is estimated using an ultrastacked correlation corresponding to the estimate of the delay value and the estimate of the modulation frequency value resulting from the successful probe. After this curve is available, the delay estimate and other information are estimated from it at the desired precision and there is no further necessity in searching for this satellite signal in the sampled data.

The present invention is better understood upon consideration of the detailed description below and the accompanying drawings.

BRIEF DESCRIPTION OF THE DRAWINGS

FIG. 5.1 and 5.2 illustrate a process that is performed after the initial acquisition of a signal.

It is understood that each of blocks in FIGS. 2–5 represents a task that can be carried out either in software or in hardware. Systems and apparatus to perform these tasks can be designed according to the practice familiar to those skilled in the arts.

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
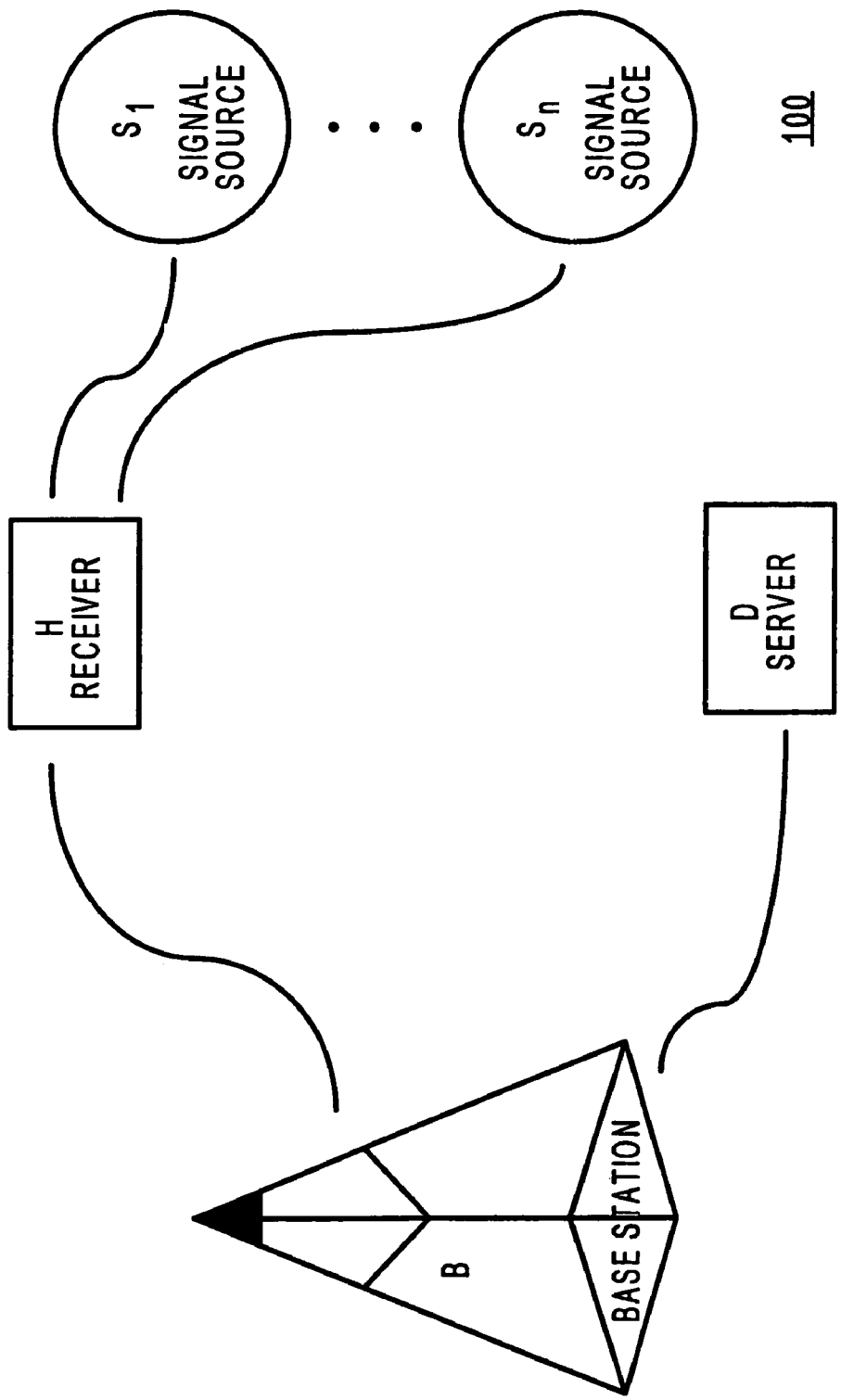
FIG. 1 is a block diagram that illustrates a location-determining system.

FIG. 1 is a block diagram that illustrates a system overview for determining the location of a receiver. System 100 comprises a plurality of signal sources of which only signal sources $S_1$ and $S_n$, are shown in FIG. 1. In addition, system 100 comprises a receiver H, a base station B, and a server D.

By way of example, only one base station and one server are shown in system 100. For example, in a practical system, there may be multiple base stations and multiple servers. In other embodiments of the invention, the server may be co-located with the base station or with the receiver.

Examples of signal sources are GPS satellites. Examples of receivers are Global Positioning System receivers, cell phones with embedded signal receivers, Personal Digital Assistants (PDAs) with embedded signal receivers, etc. For the purpose of explanation, the embodiments of the invention are explained with respect to a set of Global Positioning System (GPS) satellite vehicles that is overhead the location of receiver H at any given time. Thus, in the example, of FIG. 1, $S_1$ through $S_n$ represent a plurality of signal sources that make up the set of Global Positioning System (GPS) satellite vehicles that is overhead the location of receiver H at any given time.

By way of example, the GPS satellite vehicles produce analog signals. Each analog signal is received at receiver H. The combined signal resulting from the signals that are received at H is herein referred to as a "received signal". Thus, the received signal contains, in addition to noise, contributions from all the GPS satellite vehicles that are overhead the receiver. Typically, there is an unknown delay in time from the time the analog signal leaves a particular GPS satellite vehicle and the time that the signal is received at receiver H. Such a delay is herein referred to as a "delay value". In one embodiment of the invention, H converts the analog signal into discrete values as a function of time by digitizing the received signal. The digitized received signal is herein referred to as a "sampled signal" or "sampled data". In one embodiment of the invention, H transmits the sampled data to server D for processing. In others, the processing occurs in a computational engine such as a DSP colocated with the receiver itself.

Further, by the time the signal transmitted by each of the satellite vehicles over-head reaches the receiver, the signal's original frequency is modulated by an unknown modulation frequency value, also called "carrier frequency", due to a Doppler shift, which may, for example, include a clock Doppler of the satellite vehicle, a clock Doppler of the receiver, and/or the Doppler shift due to relative motion of the receiver with respect to the particular signal source ("relative motion"). If it is assumed that the relative motion of each signal source (satellite vehicles, for example) with respect to receiver H is a known quantity, and that the satellite clock Dopplers are also known, then the clock Doppler of the receiver may be determined by calculating the modulation frequency value corresponding to one of the signals that are present within the received signal.

Technique for Acquiring Signals

The system described here is similar in many respects to that disclosed in Application 337, and so common elements will not be elaborated on below.

Figure 2:
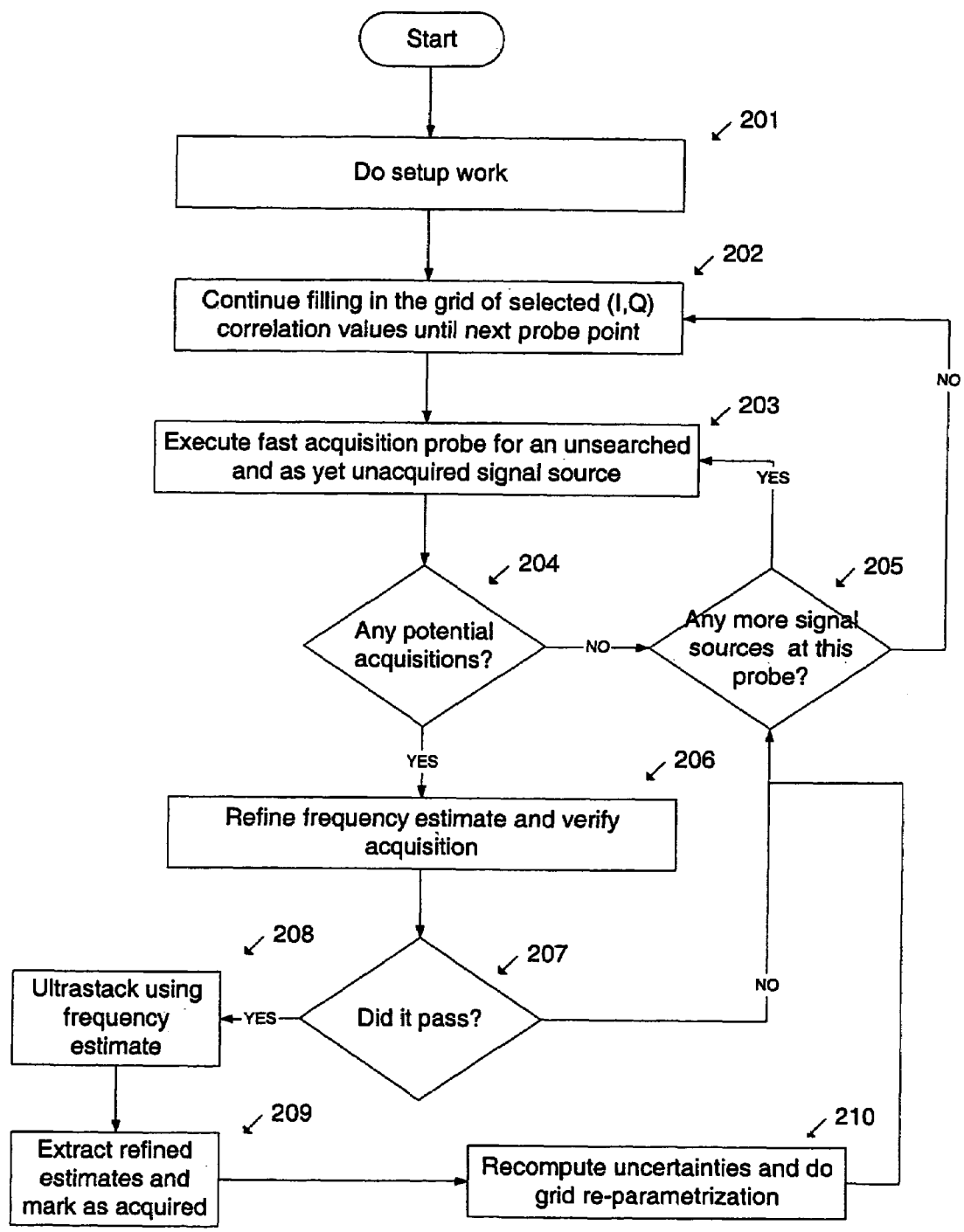
FIG. 2 illustrates an overall method and system to acquire location-determining signals.

The overall procedure is depicted in FIG. 2 and works as follows:

First, the system does some initial setup computations and calculates what it needs to do with the sampled data (Box 201 in FIG. 2). Once the initial setup has occurred, the main loop of the algorithm begins. This main loop does two things: build a grid of stored values based on processed chunks of data (Block 202 in FIG. 2), and execute probes to see if satellite signals may be acquired based on the data processed so far (Box 203 in FIG. 2). It executes the probes in at specific probe points, such as powers of 2. For example, it may schedule probes to be executed at 1 ms, 2 ms, 4 ms, up through 2048 ms. When it comes time to execute probes, these are done in a "breadth first manner" with one being done for candidate satellite signal that is as yet unacquired.

The individual probes themselves are each performed using the Fast Searching techniques described in Application 227. Upon finding a potential acquisition (Block 204 in FIG. 2), a "depth first" computation ensues that refines the frequency estimate for the satellite signal by processing more sampled data (Block 206 in FIG. 2). If the results of the "depth first" computation pass a verification test (Block 207 in FIG. 2), then the results are used to extract the desired frequency and code-phase estimates for this satellite signal (Blocks 208 and 209 in FIG. 2). Once this information is extracted, it is used to refine the current uncertainty bounds (Block 210 in FIG. 2), using the techniques previously described in Application 229. The information is also saved for later use in location determination, and the satellite is considered acquired. Based on the refined uncertainty bounds, the grid parameters may be changed to enable more efficient computation (Block 210 in FIG. 2).

The Grid

The information stored during the processing of the signal may be conceptualized as a three dimensional grid. Along the horizontal axis, consider the sample time increasing in chunks. Along the vertical axis, consider a range of code-phases. And along the third dimension, consider slices for the various satellites that are to be considered.

The horizontal and vertical axes represent underlying continuous quantities, while the third dimension is inherently discrete. Since memory is discrete, the time-codephase planes need to be divided into discrete boxes. Divide the time axis for an individual satellite into chunks of duration $T_c$. The code-phase axis is divided on the basis of representative points with spacing $\Delta$ between them. For each box $(i,t,\tau)$ in this three dimensional grid, store a pair of numbers: $(I,Q)_i(\tau,f_i)$ that represent the I and Q correlation integrals of the sampled data from $[t,t+T_c]$ with the appropriately filtered and modulated code for satellite i at approximate frequency $f_i$ at hypothesized delay $\tau$.

Let S represent the number of satellites, T the total duration of data to be processed with this grid, and $\Delta_i$ is the code-phase uncertainty for satellite i. The total number of possible points in the grid is roughly equal to $$\left(\frac{T}{T_c}\right)\left(\frac{\sum_i \Delta_i}{\tau_s}\right)$$

How to Fill in the Grid

Filling in a grid point involves calculating the appropriate (I,Q) correlations at the appropriate frequency and all the codephases of interest. Broadly speaking, there are two different ways to calculate the correlations.

The first is to take an FFT of the unmixed chunk with zero padding, multiply by the FFT of the pre-mixed reference signal (the PRN code appropriately sampled and filtered for the application at hand), take the inverse FFT, and read off the values of interest after multiplying them by the appropriate complex phase adjustor for the position in the data. The length of zero padding is determined by the span $\Delta_t$ of the code-phases of interest. Enough zeros are needed as to ensure that for all the shifts of interest, the non-zero parts never wrap around. For example, an implementation may use the smallest amount of zero-padding larger than this so that the length of the chunk is the nearest power of two or other convenient point. The pre-mixing may be by the known satellite Doppler and any a priori known component of the frequency due to motion or clock error.

The second way is to do the above, except mix the chunk using the right phase adjustor and frequency before taking the FFT, and use the FFT of the unmixed reference signal. In this case, no zero-padding is necessary if the chunk is an integer number of milliseconds long since the PRN codes are periodic with 1 ms, and no mixing is done to them.

Everything above may be multiplied by the appropriate data bit after doing the correlation. In the second case, if the chunk size is larger than 1 ms, then post-mixing, but pre-FFT, summing of the data should be done as described in Application 228.

The choice between the two approaches above may be made on the basis of estimated computational difficulty. Generally, using the premixed reference signal will be faster overall whenever the system is using zero-padded FFTs anyway.

Let M be the number of samples in a nominal millisecond, let $\Delta$ be the nominal intersample spacing, and let the reference signal $\xi((t)$ be the appropriately filtered and sampled baseband version of the satellite's PRN code. Consider a single chunk of the the data $\{x_i\}$ that begins at point number lM+p and has duration $C_{l,p}$. The other parameter that is needed in order to fill in the grid point is $f_{l,p}$, the frequency used to compute the (I,Q) correlations.

For a given "code-phase" $\sigma$, the algorithm needs to compute:

$$(I,Q)_{l,p}(\sigma) = \sum_{k=0}^{C_{l,p}-1} x_{lM+p+k}\left(e^{2\pi j(f_{l,p}\Delta)(\sigma+p+k)}\xi(\Delta(\sigma+p+k))\right)$$

Mixing the Reference

Notice that the reference signal $(e^{2\pi j(f_{l,p}\Delta)(p+k)}\xi(\Delta(p+k)))$ may be precomputed without regard to the shift $\sigma$ to be applied to it for the specific correlations. So, if the system is interested in these calculations for a range of $\sigma$, they may be done easily using the FFT of an appropriately zero-padded chunk of $\{x_i\}$ from lM+p to lM+p+$C_{l,p}$, and the FFT of the reference signal over a range long enough to contain all the shifts $\sigma$ of interest. This involves multiplying the two FFTs together and taking an inverse FFT. At this stage, a frequency domain code-phase adjustment for known errors might also be done in some implementations as described in Application 228. The (I,Q) at the possibly adjusted code-phases $\sigma$ of interest may then be read off. Further phase tweaks may be applied to the (I,Q) before they are stored in the grid. These tweaks are described in the section below where the synthesizing for the fast acquisition probes are discussed.

Figure 3:
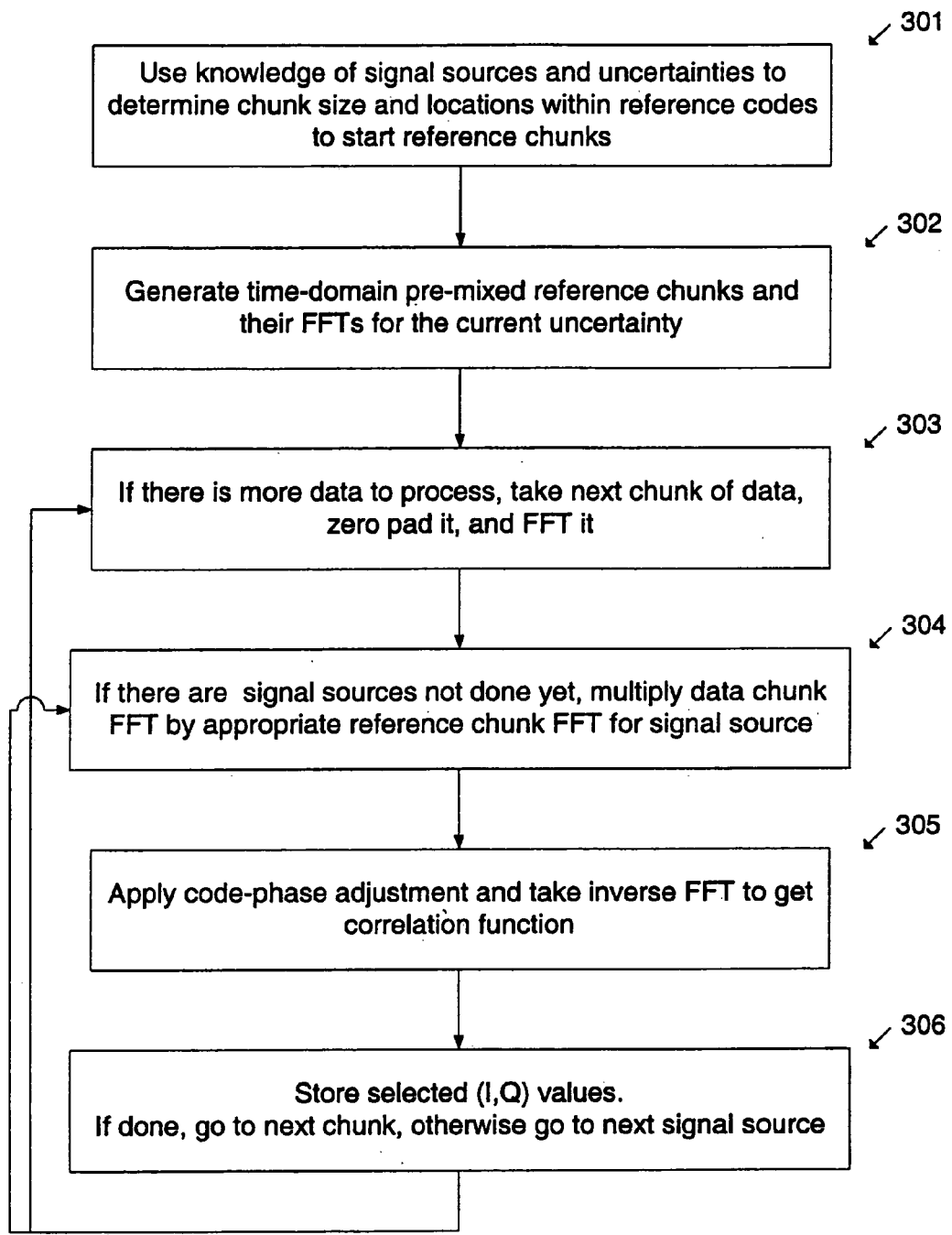
FIG. 3 illustrates a process to mix the reference signals.

The process is illustrated in FIG. 3. In Block 301, the system uses the knowledge of the signal sources and the current uncertainties to determine the chunk size and the subsets of the reference PRN codes that will be sampled and filtered to generate the reference signal chunks to be used. Then, in Block 302, the reference signal chunks are generated in the time-domain, mixed to the appropriate frequency $f_{l,p}$, and their FFTs taken. As a part of the combined system, both Block 301 and 302 may be performed during Block 201 of FIG. 2. Insofar as the implementation may re-parameterize the grid after acquiring a signal, the actions of Blocks 301 and 302 of FIG. 3 may be repeated in Block 210 of FIG. 2.

The remaining Blocks 303, 304, 305, and 306 of FIG. 3 represent actions performed within Block 202 of FIG. 2. In Block 303, the next chunk of data is zero-padded so that it matches the size of the reference chunks, and then the FFT is applied to it. The result is passed to Block 304 where it is multiplied by the FFT of the appropriate reference chunk for a signal source for which the entry in the grid corresponding to this particular data chunk is not yet filled in. The result of this multiplication is passed into Block 305 where the appropriate code-phase adjustment may be applied using the techniques described in Application 228. The Inverse FFT is taken to get the correlation function for this signal source and this particular chunk. This correlation function is passed on to Block 306 where the appropriate (I,Q) values are taken and stored in this grid at the appropriate places corresponding to the range of code-phases of interest. As described further below in this application, the storing step may involve further tweaks to the phase of the stored (I,Q) values. One important tweak not mentioned below is to multiply the stored (I,Q) by the value for the data bit containing this chunk. After storage, the process continues to iterate until all the signal sources have been considered and all the chunks have been processed.

Aside from avoiding any mixing steps, this approach also offers computational benefits because the system may reuse the FFT of the zero-padded chunk of $\{x_i\}$ from lM+p to lM+p+$C_{l,p}$ as long as the chunks are the same for the different satellites.

Mixing the Data

The more traditional approach is to mix the signal itself. In that case, it makes sense to rewrite the desired sum as:

$$(I,Q)_{l,p}(\sigma) = \sum_{k=0}^{C_{l,p}-1}\left(x_{lM+p+k}e^{2\pi j(f_{l,p}\Delta)(\sigma+p+k)}\right)\xi(\Delta(\sigma+p+k))$$

One interesting case is where p=0 and $C_{l,p}$ is an integer multiple CM so the chunk is an integer C milliseconds wide. In that case, the sum may be rewritten:

$$(I,Q)_{l,p}(\sigma) = \sum_{k=0}^{M-1} e^{2\pi j(f_{l,p}\Delta)(-lM+\sigma)}\left(\sum_{c=0}^{C-1} x_{lM+cM+k}e^{2\pi j(f_{l,p}\Delta)(lM+cM+k)}\right)\xi(\Delta(\sigma+p+k))$$

If there are no significant code-phase adjustments, then this is fine as is and the computations may proceed by first calculating the inner sum above on the mixed data, and then correlating that with the unmixed reference signal ξ. But in the cases where C>1, there may be concerns introduced by the necessary code-phase adjustments. This may be done by using for $$\frac{(I,Q)_{l,p}(\sigma)}{e^{2\pi j(f_{l,p}\Delta)(-lM+\sigma)}}$$

$$\sum_{k=0}^{M-1}\left(\sum_{c=0}^{C-1} x_{lM+cM+\lfloor(\hat{b}-1)(lM+cM)+\frac{1}{2}\rfloor+k}\, e^{2\pi j(f_{l,p}\Delta)(cM+\lfloor(\hat{b}-1)(lM+cM)+\frac{1}{2}\rfloor+k)}\right)$$

$$\xi(\Delta(\sigma+p+k))$$

This idea of summing the mixed signal before taking the FFT is described in detail in Application 228 where the need to take the data bits into account is also described. But even then, there is a residual unadjusted code-phase term of:

$$\frac{1}{C}\sum_{c=0}^{C-1}(\hat{b}-1)(lM+cM)-\left\lfloor(\hat{b}-1)(lM+cM)+\frac{1}{2}\right\rfloor$$

As above, this may be compensated for in the frequency domain if the correlations are calculated by taking FFTs. Furthermore, this shift should be taken into account whenever the σ are considered during probes. As with the mixed reference case, it is important that the results stored in the grid be multiplied by the value for the data bit containing the chunk. If the data bit values have already been taken into account during the summing process, one skilled in the art will see that there is no need for another multiplication by the data bit value.

Choosing the Frequency

The frequency $f_{l,p}$ is the sum of components that represent the true intermediate frequency of mixing $f_{if}$, the common-mode clock rate error $f_o$ that comes from the inaccuracy in the receiver's local oscillator, and the known Doppler shift of the individual satellite signal $f_s$. Furthermore, there is an effect due to the known and not-common-mode difference between computationally nominal intersample time Δ, and the hardware's nominal intersample time Δ'. This discrepancy occurs due to integer effects and the desire to take advantage of some computational savings that may occur when the system processes blocks of sizes with small prime factors. As a result, the system may sometimes pretend for computational purposes that the sampling rate was some number with small factors (like an exact power of 2), when in reality the rate was known to be a number with large prime factors.

In this case, the frequency is set to:

$$f_{l,p}=\frac{\Delta'}{\Delta}(f'_{if}+f'_o+f'_s)$$

If there is uncertainty surrounding $f_o$ and $f_s$, then the above value may be chosen based on the midpoint of the range of $f_o+f_s$.

Executing a Probe

The fast acquisition probes involve trying to find a frequency, code-phase pair that is likely to be the true value based on the values stored in the grid so far for the signal source in question. This is done by choosing a threshold for which it is highly unlikely that the noise by itself could generates a correlation with magnitude above it. One technique for doing this is described in Application 227.

Which Code-phases to Extract at

As a part of the fast acquisition probe algorithm, it is necessary to consider a set of given delay hypotheses τ. For each hypothesis, the system needs to evaluate which code-phases σ it needs to use to extract the (I,Q) values from the grid of points and to place into the array of (I,Q) it will use to synthesize coherent integrals at various candidate frequencies. If there were no stretching or compaction of the reference signal due to Doppler effects, then one approach is to determine which σ corresponds to τ mod 1 ms.

However, there is stretching and shrinking due to Doppler, and so the σ is going to change slowly based on lM+p. Let b represent the stretching or compacting factor. So, for block (l, p), the system needs to adjust σ by (b−1)(lM+p) samples.

The stretching or shrinking factor b depends on the ratio of the computationally nominal inter-sample time Δ to the hardware nominal inter-sample time Δ', the assumed common-mode clock frequency offset $f_o$, and the satellite/receiver motion Doppler frequency $f_i$. The frequencies all derive their interpretation relative to the true GPS carrier frequency $f_c$.

$$b=\frac{\Delta'}{\Delta}+\frac{f'_o+f'_s}{f'_c}$$

$$=\left(\frac{\Delta'}{\Delta}+\frac{\hat{f}'_o+\hat{f}'_s}{f'_c}\right)+\frac{\check{f}'_o+\check{f}'_s}{f'_c}$$

$$=\hat{b}+\check{b}$$

The above sequence of equations illustrates the definition of the code-phase adjustment b as being the combination of a known part $\hat{b}$ and a variable part $\check{b}$. Since $\check{f}_o+\check{f}_s$ is actually a range of possible values under consideration, there are a range of possible $\check{b}$ values [b, $\bar{b}$] as well.

Two ways to apply the code-phase adjustments are described in Application 228. The direct approach is to apply them during the grid making process itself by the appropriate complex multiplication in the frequency domain corresponding to a time shift. But this is only possible for the component of the change ($\hat{b}-1$)(lM+p) that is known during the grid building. This is usually also the dominant term since the motion of the satellites is usually an order of magnitude greater than any motion or unknown clock uncertainty here at the receiver. For the unknown component, the choice is to apply them as an integer correction $$\left\lfloor(\check{b}-1)(lM+p)+\frac{1}{2}\right\rfloor$$

to the code-phases at which the system picks (I,Q) out of the grid.

Synthesizing for the Fast Acquisition Probe

The points in the grid are all marked with two major parameters: the frequency $f_{l,p}$ and the chunk length $C_{l,p}$. In order to synthesize a long integral using the techniques in Application 227, it is necessary to give a complex weight to each (I,Q) term before summing them up at a particular frequency. In one embodiment, there are four major weights that need to be applied:

A known acceleration induced carrier phase compensation, computed by calculating the known satellite acceleration a in the direction of the receiver and using $$e^{2\pi j \frac{1}{2} \frac{d(\Delta(lM+p))^2 fc}{c}}$$

as the complex phase adjustor to the (I,Q) value. This looks at lM+p and sees how much the carrier phase will deviate from a perfect straight line to account for the known acceleration of the receiver and satellite. The acceleration itself may be calculated directly, numerically, or the entire spatial deviation from linearity represented by $$\frac{1}{2}\hat{a}(\Delta(lM+p))^2$$

may be calculated exactly from the ephemeris and known motion parameters. As this is slowly varying with time and space, this may actually be applied when the system first fills in the grid rather than during the synthesizing or Fast Acquisition Probes. This same adjustment is also what is applied within the ultrastacking process.

A phase centering correction is the second major weight. This may be accomplished by multiplying by:

$$e^{2\pi j(-f_{l,p}\Delta)\frac{C_{l,p}}{2}}.$$

Notice that this too may be applied when the grid is first filled in. It may also be performed implicitly in some embodiments by changing the way in which the (I,Q) are computed to begin with.

An initial point correction is the third major weight. Multiply by: $e^{2\pi j(-f_{l,p}\Delta)(\sigma_{l,p}+p)}$. Here, the $\sigma_{l,p}$ should include any code-phase adjustment term that was applied in the frequency domain. This too may be applied when the grid is first filled in or computed implicitly. new center frequency correction to center the search in a neighborhood of a particular $f_0$ is the source of the fourth major weight. Mix every (I,Q) in the array to this frequency by using: $e^{2\pi j(-f_0\Delta)(lM+p)}$.

Let $Z_{l,p}$ be the resulting complex number representing $(I,Q)_{l,p}$ after all these compensations. Then to synthesize an integral directly at a particular frequency f, just do $\Sigma_{\{l,p\}} e^{2\pi j(f-f_0)\Delta(lM+p)} Z_{l,p}$ as described in Application 227. This may be implemented straightforwardly by using an FFT on the array, possibly with some zero padding depending on the resolution of f desired. This is described in Application 227. In some implementations, zero padding is performed so as to grow the size of the array by a factor of 4.

The resulting synthetic (I,Q) generated by the FFT may then have the magnitude checked against the threshold to determine if there are any potential acquisitions in the near neighborhood of this particular frequency and delay hypothesis.

Refining and Verification

Once a satellite signal has been acquired, it is often worthwhile to immediately go forward and do further processing for more data segments. This allows the system to both verify that the correlation is indeed significant, and to reduce the frequency uncertainty sufficiently to allow for significant "stacking" advantages on other satellites.

Adjusting the Grid

In case of acquisition of a new satellite signal, the uncertainty intervals may shrink dramatically. This reduction in uncertainty intervals is most easily seen in the shrinking of all the code phase uncertainties. The other side of the savings is in the reduction of the frequency uncertainty. The major gains are obtained in stationary cases when the first satellite's signal is acquired and the dominant uncertainty in frequency due to the clock is effectively removed. In such cases, the need for small chunks for coherent processing with a single frequency is eliminated and the system may use a much larger chunk that comes from the tighter frequency range.

In this step (Block 210 in FIG. 2), the chunk size $T_c$ for each satellite may be adjusted. One such rule is to ensure that the chunk size $T_c$ is such that the frequency uncertainty interval induces at most $$\pm\frac{1}{4}.$$

cycle slip over the duration $T_c$. For example, given a 500 Hz total uncertainty range, a 1 ms chunk has a maximum cycle slip of $$a \pm \frac{1}{4}$$

To make the old values in the grid compatible with the new chunk size, synthetic combination techniques from Application 227 may be used to collapse contiguous grid points together into new (I,Q) values corresponding to the larger chunk size and the new frequency. This may be done by combining them into a synthetic integral at the new center frequency of the uncertainty interval.

It is convenient to adjust $T_c$ to an integer number of milliseconds if this is feasible. The computational advantages are so substantial that if it is possible to reach an integer number of milliseconds, it is often even worth throwing out the existing grid points entirely and just recalculating what is needed based on the new grid parameters.

Refinement

At times in the algorithm, it is important to continue to evaluate correlations for a particular satellite using specific carrier information and a good idea about the code-phase. Two uses for this are to perform precision and multipath related calculations at the end, and to extend a probe in order to refine the estimate of the carrier frequency.

Frequency Estimate Refinement and Basic Probe Verification

After an initial potential acquisition is found, the system may refine the carrier frequency estimate and verify the acquisition. The idea here is to achieve a certain level of confidence regarding both the code-phase estimate and the frequency estimate.

The code-phase estimate's quality is determined primarily by the number of samples of data that are averaged, in other words, the total duration of data that is processed. Given an estimate of the initial SNR, one skilled in the art may work out the total duration required to achieve the specific objectives at hand. The frequency uncertainty interval is slightly different. The confidence in the frequency estimate is determined principally by the total span of the data that is processed. Processing data that spans twice as long results in Doppler estimates that are twice as sharp.

There are two broad cases of interest here. The first is in situations where the total span required to estimate frequency sharply is larger than the total duration required for other purposes. In such situations, the optimum strategy in general is to process the data sparsely in bunches. The second occurs when the total duration of data that needs to be processed coherently is larger than the total span required for the desired frequency uncertainty interval. In such cases, the optimum strategy is to process the data contiguously.

Either way, the approach is to proceed recursively, refining the frequency estimate as longer spans and durations are processed. The key constraint to respect is regarding the spacing of the centers of adjacent blocks that are processed. The frequency uncertainty must not introduce any ambiguous phase relationships across that spacing. For example, if the frequency uncertainty is 100 Hz, then a spacing of length T seconds between a pair of adjacent blocks means that phase may slip up to $2\pi 100T$ between the blocks. For this to remain unambiguous enough to refine frequency estimates, it must remain less than $2\pi$. To be safe, restrict it to something like $$2\pi\left(1 - \frac{1}{4}\right).$$

In effect, this constraint is what drives the stepping of the recursive algorithm. The recursion also needs to update the frequency uncertainty size based on the span. In some embodiments, this is done by considering the size of the frequency uncertainty to be $$\frac{2}{\text{span}} \text{ Hz,}$$

where the span is measured in seconds. This reflects the fact that the frequency estimate could maximally be off by $$\pm \frac{1}{\text{span}}$$

before it hits a null due to complete phase cancellation.

Figure 4:
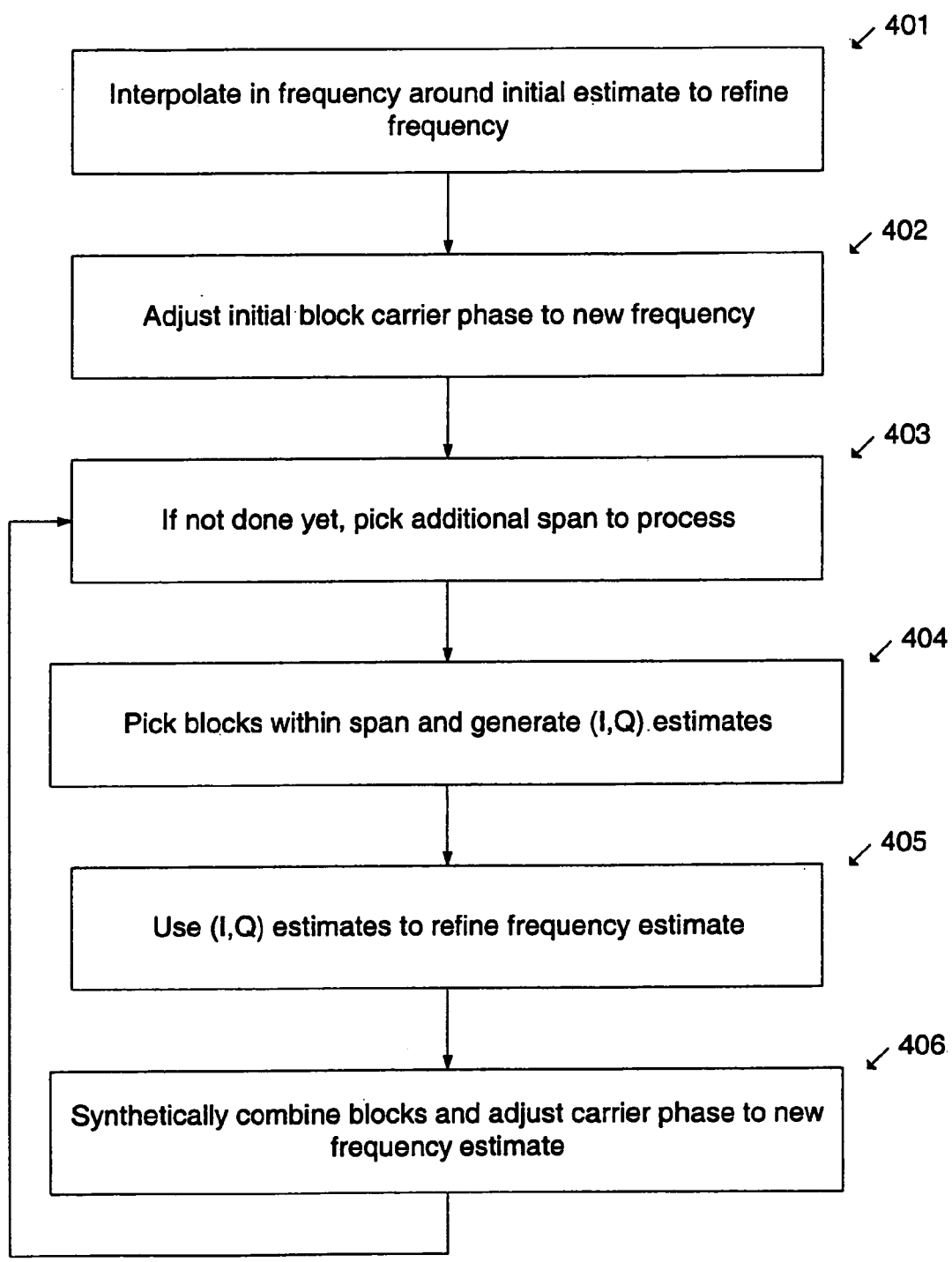
FIG. 4 illustrates a process to refine the frequency estimate.

Thus, the post initial acquisition algorithm is described as illustrated in FIG. 4.

First, do an initial frequency refinement by interpolation (Block 401 of FIG. 4). If this frequency was determined by finding the maximum magnitude for correlations computed or synthesized at a set of frequencies, then (I,Q) values for neighboring frequencies at this hypothesized delay were also generated. Existing template matching techniques from Application 338 may be applied to get a finer estimate of the frequency. Alternatively, in some embodiments, the system may synthesize (I,Q) integrals at a fine granularity using techniques from Application 227 and may apply standard unimodal search algorithm to find the peak. A recursive golden-mean search is a choice used in some implementations. If the (I,Q) values at neighboring frequencies are not available, then they may be generated on demand using ultrastacking.

Next, in Block 402 of FIG. 4, the carrier phase of the initial block's (I,Q) is adjusted to that which corresponds to what it would have been had it been calculated at the interpolated frequency estimate. This may be accomplished using a complex rotation.

Now, the system begins the recursive probe process illustrated by Blocks 403, 404, 405, and 406 in FIG. 4. Taking into account the maximum phase-slip constraint, generate (I,Q) calculations at the current frequency estimate for appropriately centered segments of sampled data that occur after the previous span. (Blocks 403 and 404 of FIG. 4) For example, a good way to proceed is to examine two segments of span $$\frac{\text{current span}}{2}$$

each. Within these segments, limited duration ultrastacking without phase information may be done to an extent applicable. The spacing between the two segments should depend on the amount of data. If there is no risk of running out of data, then it is logical to space them out to as far as the tolerable phase slip between segments will allow. Another approach is to have the segments be contiguous.

In Block 405, the system uses the previously adjusted (I,Q) for the initial segment along with the ones calculated at Block 404 to calculate a refined frequency estimate. This may be accomplished either analytically, or by applying standard unimodal techniques such as golden mean search in the neighborhood of frequency uncertainty using synthetic phase techniques from Application 227 to calculate combined (I,Q) values for the candidate frequencies and trying to maximize the magnitude.

In Block 406, the system may use the current maximizing frequency as the current frequency estimate and adjust the uncertainty to correspond to the new total span. Adjust the synthetic (I,Q) at the maximizing frequency by rotating its carrier phase to correspond to an estimate of what it would have been were it calculated explicitly at the new frequency. This is accomplished by rotating 6off the contributions from the update in frequency from the center of the component blocks and then adding together the (I,Q) values.

The process may then be recursively continued until either the desired uncertainties are reached or there is no further data to process. At the end of this, the system may extract the frequency estimate and a good bound on the uncertainty. Furthermore, the magnitude of the synthetic (I,Q) may be used to calculate a probability of false alarm that may be checked against whatever threshold chosen for basic probe verification.

Advanced Probe Verification

More sophisticated probe verification may occur after the entire signal duration of interest has been ultrastacked during the code-phase estimate refinement step.

The system may do the convolution with the 1 ms reference signal and check for the presence of other peaks in the correlation function. The presence of many other peaks may indicate if the acquisition was false due to the cross-correlations induced by another strong satellite's signal correlating with this PRN code. By assuming that clean noise is basically white, the system may calculate a probability function for expected large deviations. The presence of significant cross-correlations from other satellites in the sampled data will manifest itself as a substantial deviation between empirical counts of large deviations away from the hypothesized peak and the theoretical probabilities of such deviations assuming white noise. In some embodiments, this may be done by searching the entire correlation function and counting any points whose magnitude exceeds $$\frac{1}{2}$$

the magnitude of the candidate peak. This count may be compared to the predicted count assuming white noise and standard statistical tests applied to determine if the discrepancy is significant or not. One such test is to compare the deviation from the expected mean with the expected standard deviation to see how many standard deviations away the observed results are. If the discrepancy is significant, the system may either take further steps to compensate for the problem or may reject the acquisition entirely.

The system may also do the convolution and search the correlation function for evidence of multipath phenomena. If multipath is detected, the code-phase search may be adjusted to be around an earlier peak or the confidence range for the code-phase estimate may be made larger. In extreme cases, the acquisition may be marked as bad and discounted in the subsequent position determination.

One skilled in the art will see that many other techniques may be used to make verification decisions regarding the correlation function once the entire correlation function is made available through ultrastacking.

Precision Refinement

The approach here is illustrated in FIGS. 5.1 and 5.2. In Block 512 of FIG. 5.1, take the FFT of the ultra stacked signal made available from Block 511. This is then multiplied by the FFT of the reference signal in Block 513. By taking the inverse FFT in Block 514, the coarse-scale correlations are obtained.

At this point, apply any desired tests to the coarse-scale correlations in Block 515. This may include a multi-satellite effect eliminator, a multi-path detector, etc. Once this is done, begin the refinement process represented by Block 516 and expanded upon in FIG. 5.2.

In Block 521 of FIG. 5.2, determine the region in which further enhancement of accuracy is desired. In Block 522, an array is built that contains the possibly complex correlations from that region, and a sufficiently large neighborhood beyond that point to avoid edge effects. In some implementations, this neighborhood consists of 4 chips on either side. In Block 523, take the FFT of this array and then in Block 524, zero-pad it to the desired granularity. In some implementations, this zero-padding is done so as to grow the size by a factor of 128. In Block 525, take the inverse FFT to get a finely interpolated correlation function in the neighborhood of interest.

In Block 526, search the resulting interpolated correlation function for a magnitude peak to determine the refined estimate for code-phase. This refined code-phase estimate may then eventually be used in the position determining step.

Ultrastacking

As the previous sections have shown, being able to ultrastack is important in doing refinements after a successful probe. It has other uses as well. It may be used anytime the system needs to generate an (I,Q) value or set of values at a specific estimate of frequency. This may be important when the system cannot generate estimates of the (I,Q) in other cheaper ways.

Basic Strategy

The basic way to proceed is to stack up the data in the time-domain using the carrier information and data bit values, making integer code-phase adjustments along the way as described in Application 228. Two special cases of this, with and without phase information, are discussed next. At the end of this coherent averaging step, the system has 1 ms worth of samples that should contain exactly one replica of the clean filtered PRN code of interest, with whatever little bit of noise surviving the averaging process. This relatively clean 1 ms may then be correlated with the reference signal at different code-phases to get the correlations of interest.

Without Phase Information

The idea of stacking (as described in Application 228) is to enable the system to do coherent averaging in the time-domain directly, without having to consider the specific PRN code of interested. One skilled in the art will see that satellite specific information comes into the picture in the form of knowledge of the data bits and the exact frequency for the unit power complex exponential to mix by before the system sums blocks up. In addition, Application 228 shows that integer sample code-phase adjustments are useful in the summing process to take into account the impact on code-phase of Doppler effects. The equations in Application 228 may be applied by using the definitions of b, b̂, and b̆ given above in place of the explicit code-phase adjustment tied to the frequencies themselves.

Ultrastacking takes this idea to its extreme and uses it to sum up all the data. The blocks on which the data-bits are changing may either be thrown out entirely (by setting to 0, or just skipping them), or the system may use the initial estimate of τ obtained in the probe to multiply the appropriate samples within the block by the appropriate data bit value. The result of the ultrastacking is a single 1 ms long segment of complex valued data. Each real valued sample of raw data needs to be multiplied by a complex number representing the effect of the mixing frequency (along with the known acceleration), with possibly another multiplication by −1 if the data bit value is −1. The results are then summed, applying the appropriate integer code-phase adjustments in determining the values summed to each other.

This ultrastacked sample may then be correlated against a single real-valued un-mixed PRN code to get complex-valued correlations of interest. These correlations may be performed using frequency domain or direct time-domain techniques as are appropriate to the situation. From these complex correlations at the appropriate peak, the system may extract an estimate for the phase as well.

With Phase Information

If the carrier phase has been estimated well prior to the ultrastacking process, this information may be used to simplify computations. Instead of mixing the data with a unit power complex exponential, it is mixed with the unit power $\sqrt{2}\cos(f(t)+\phi)$ signal where $f(t)$ takes into account the known satellite acceleration and mixing frequency, while $\phi$ represents the known carrier phase. As before, the system takes the data-bit values and code-phase adjustments into account while doing the stacking.

The result of the ultrastacking are now a single 1 ms long segment of real-valued data. This may be correlated as before with the real unmixed PRN code to get real-valued correlations. One advantage of doing the computations this way is that they may be done using real operations and may run twice as fast.

The above detailed description is provided to illustrate specific embodiments of the present invention and is not intended to be limiting. Numerous variations and modifications within the scope of the present invention are possible. The present invention is set forth in the following claims.

I claim:

1. A method to determine location information of a receiver comprising the steps of:
   receiving a signal containing a plurality of location-determining signals associated with a plurality of signal sources, wherein each of said signal sources is associated with a periodic reference signal;
   correlating a plurality of signal chunks of said received signal with said reference signals to yield a grid of correlation values;
   executing a plurality of probes in said grid to generate a plurality of refined correlation values;
   evaluating said refined correlation values to identify potential acquisitions of said signal sources;
   verifying each of said potential acquisitions to yield a plurality of confirmed acquisitions; and
   determining said location information based on said confirmed acquisitions.

2. The method of claim 1, wherein the duration of said signal chunks is less than a period of said periodic reference signals.

3. The method of claim 1, wherein said correlating comprises the step of mixing said reference signals with a modulation signal.

4. The method of claim 1, wherein said correlating comprises the step of mixing said received signal with a modulation signal.

5. The method of claim 1, wherein said correlating is based on a navigation signal.

6. The method of claim 1, wherein said correlating comprises the step of applying a plurality of code-phase adjustments.

7. The method of claim 1, wherein said correlating comprises the step of calculating the fast fourier transform of each signal chunk.

8. The method of claim 1, wherein executing said probe comprises:
   selecting a signal source;
   selecting a hypothesized code-phase;
   selecting a plurality of correlation values from said grid, wherein said correlation values are associated with said selected signal source and said selected hypothesized code-phase, to yield a correlation signal; and
   calculating the fast fourier transform of said correlation signal, to yield a plurality of refined correlation values associated with a plurality of refined frequency values.

9. The method of claim 1, wherein said probes are executed in a breadth-first manner, whereby all signal sources are first probed at a signal duration and then at an increased signal duration.

10. The method of claim 1, further comprising the step of providing a code-phase uncertainty interval, and wherein said probes are associated with a plurality of code-phases within said code-phase uncertainty interval.

11. The method of claim 1, wherein said evaluating comprises comparing said refined correlation values with a threshold, and wherein said threshold is based on a number of code-phase hypotheses and a number of doppler frequency hypotheses.

12. The method of claim 1, wherein said verifying is carried out in increasing signal duration order and comprises the step of refining a doppler frequency estimate.

13. The method of claim 1, wherein said verifying a probe comprises calculating a correlation magnitude curve.

14. The method of the previous claim, wherein said correlation magnitude curve is calculated from an ultra-stacked signal.

15. The method of claim 13, comprising applying a multi-peak test on a selected probe, wherein said multi-peak test comprises the steps of
   calculating the number of peaks above a threshold in said correlation magnitude curve; and
   discarding said probe if said number of peaks is statistically large.

16. The method of claim 13, further comprising a multi-path test, wherein said multipath test comprises the step of detecting a large peak ahead of and near to an acquisition peak in said correlation magnitude curve.

17. The method of the previous claim, wherein said multi-path test further comprises the step of resetting said acquisition peak to said large peak.

18. The method of claim 1, further comprising the step of utilizing said confirmed acquisitions to aid the acquisition of other signal sources.

19. The method of claim 1, wherein said aiding comprises the step of ultra-stacking said received signal.

20. The method of claim 1, further comprising the step of ultra-stacking said received signal based on said confirmed acquisition.

21. The method of claim 1, further comprising the step of re-parameterizing said grid based on a reduced uncertainty provided by each confirmed acquisition.

22. The method of claim 1, further comprising the step of extracting a refined codephase estimate from each confirmed acquisition.

23. The method of claim 22, wherein extracting said refined code-phase value comprises the step of applying a code-phase adjustment.

24. The method of the previous claim, wherein said code-phase adjustments incorporate a discrepancy between a computationally nominal inter-sample time and a hardware nominal inter-sample time.

25. The method of claim 22, wherein extracting said refined code-phase value comprises the steps of:
   ultra-stacking said received signal, to yield an ultra-stacked signal;
   calculating a correlation magnitude curve with said ultra-stacked signal; and
   interpolating said correlation magnitude curve to extract said refined code-phase.

26. A location-determining system comprising:
- a plurality of signal sources associated with a plurality of periodic reference signals;
- a receiver receiving a signal containing a plurality of location-determining signals transmitted by said signal sources;
- means for correlating a plurality of signal chunks of said received signal with said reference signals to yield a grid of correlation values;
- means for executing a plurality of probes in said grid to generate a plurality of refined correlation values;
- means for evaluating said refined correlation values to identify potential acquisitions of said signal sources;
- means for verifying each of said potential acquisitions to yield a plurality of confirmed acquisitions; and
- means for determining location information based on said confirmed acquisitions.

27. The system of claim 26, wherein said means for correlating comprises means for performing fast fourier transforms.

28. The system of claim 26, wherein said means for correlating comprises means for mixing said reference signal with a modulation signal.

29. The system of claim 26, wherein said means for correlating comprises means for mixing said received signal with a modulation signal.

30. The system of claim 26, wherein said means for executing comprises:
- means for selecting a plurality of correlation values from said grid, wherein said correlation values are associated with a selected signal source and a selected hypothesized code-phase, to yield a correlation signal; and
- means for calculating the fast fourier transform of said correlation signal.

31. The system of claim 26, wherein said means for verifying comprises means for calculating a magnitude curve.

32. The system of claim 26, wherein said means for verifying comprises means for ultra-stacking said received signal.

33. The system of claim 31, comprising means for applying a multi-peak test.

34. The system of claim 31, comprising means for applying a multi-path test.

35. The system of claim 26, comprising means for aiding acquisition of signal sources with said confirmed acquisition.

36. The system of claim 26, comprising means for ultra-stacking said received signal based on said confirmed acquisitions.

* * * * *